No. 761,781. PATENTED JUNE 7, 1904.
J. McTAMMANY.
APPARATUS FOR DETECTING FRAUDULENT OR IMPROPER VOTES.
APPLICATION FILED AUG. 19, 1896. RENEWED NOV. 11, 1897.
NO MODEL. 6 SHEETS—SHEET 1.

WITNESSES:
E. Batchelder
P. W. Pezzetti

INVENTOR:
J McTammany
by Wright Brown & Quinby
attys

No. 761,781. PATENTED JUNE 7, 1904.
J. McTAMMANY.
APPARATUS FOR DETECTING FRAUDULENT OR IMPROPER VOTES.
APPLICATION FILED AUG. 19, 1896. RENEWED NOV. 11, 1897.
NO MODEL. 6 SHEETS—SHEET 4.

Witnesses:
E. Batchelder
P. W. Pezzetti

Inventor:
J. McTammany
by Knight Brothers & Quimby
attys.

No. 761,781. PATENTED JUNE 7, 1904.
J. McTAMMANY.
APPARATUS FOR DETECTING FRAUDULENT OR IMPROPER VOTES.
APPLICATION FILED AUG. 19, 1896. RENEWED NOV. 11, 1897.

NO MODEL. 6 SHEETS—SHEET 5.

Fig. 8.

Fig. 9.

WITNESSES:
INVENTOR:

No. 761,781. PATENTED JUNE 7, 1904.
J. McTAMMANY.
APPARATUS FOR DETECTING FRAUDULENT OR IMPROPER VOTES.
APPLICATION FILED AUG. 19, 1896. RENEWED NOV. 11, 1897.
NO MODEL. 6 SHEETS—SHEET 6.
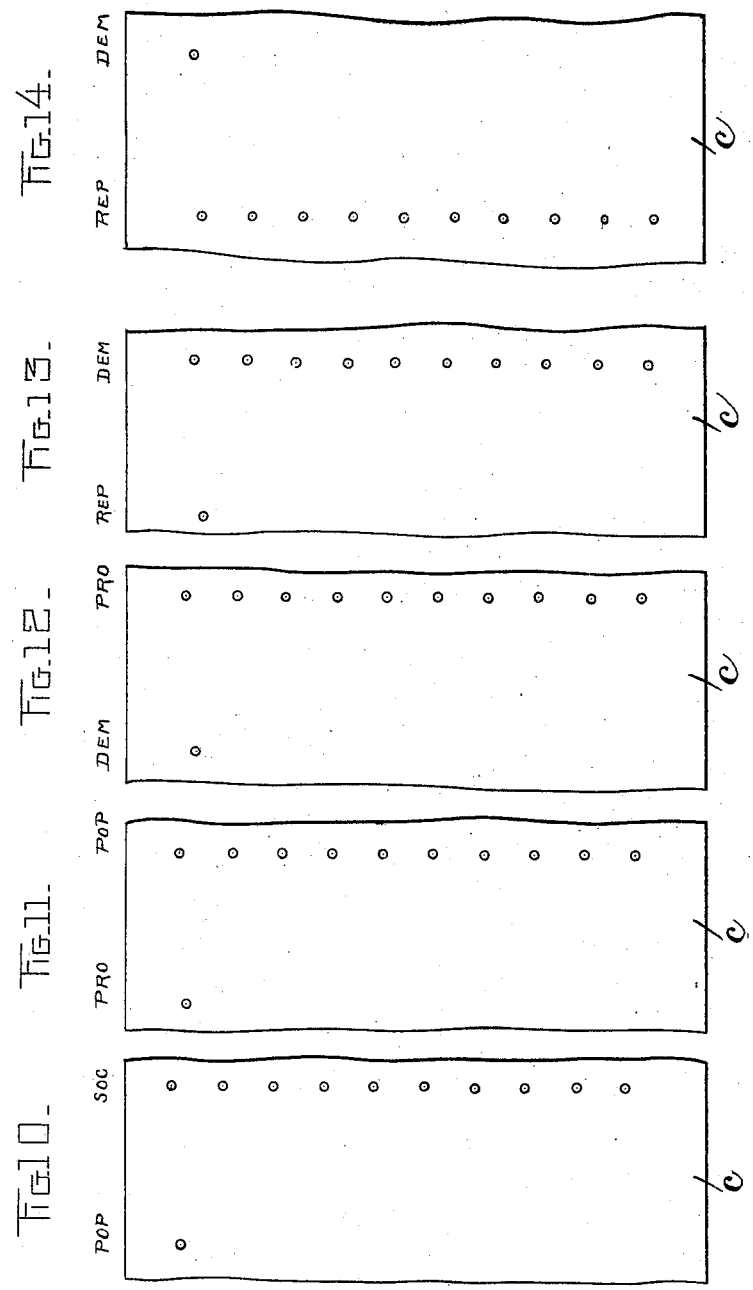
WITNESSES:
INVENTOR:

No. 761,781.                                                              Patented June 7, 1904.

UNITED STATES PATENT OFFICE.

JOHN McTAMMANY, OF SPENCER, MASSACHUSETTS, ASSIGNOR, BY MESNE ASSIGNMENTS, TO McTAMMANY BALLOT COMPANY, OF PORTLAND, MAINE, A CORPORATION OF MAINE.

APPARATUS FOR DETECTING FRAUDULENT OR IMPROPER VOTES.

SPECIFICATION forming part of Letters Patent No. 761,781, dated June 7, 1904.

Application filed August 19, 1896. Renewed November 11, 1897. Serial No. 658,204. (No model.)

*To all whom it may concern:*

Be it known that I, JOHN MCTAMMANY, of Spencer, in the county of Worcester and State of Massachusetts, have invented certain new and useful Improvements in Apparatus for Detecting Fraudulent or Improper Votes, of which the following is a specification.

This invention relates to apparatus for use in connection with perforated tally-sheets which have been perforated in voting-machines and contain the records of a number of voters, each record being made up of perforations formed in a tally-sheet.

The invention has for its object to provide an apparatus whereby a tally-sheet taken from a voting-machine equipped with punches whereby the voters make their record by perforating the sheet may be rapidly examined for the purpose of detecting improper or fraudulent ballots, or, in other words, indicating whether any voter has voted for more than one candidate for the same office.

The invention consists in the several improvements which I will now proceed to describe and claim.

Figure 1:
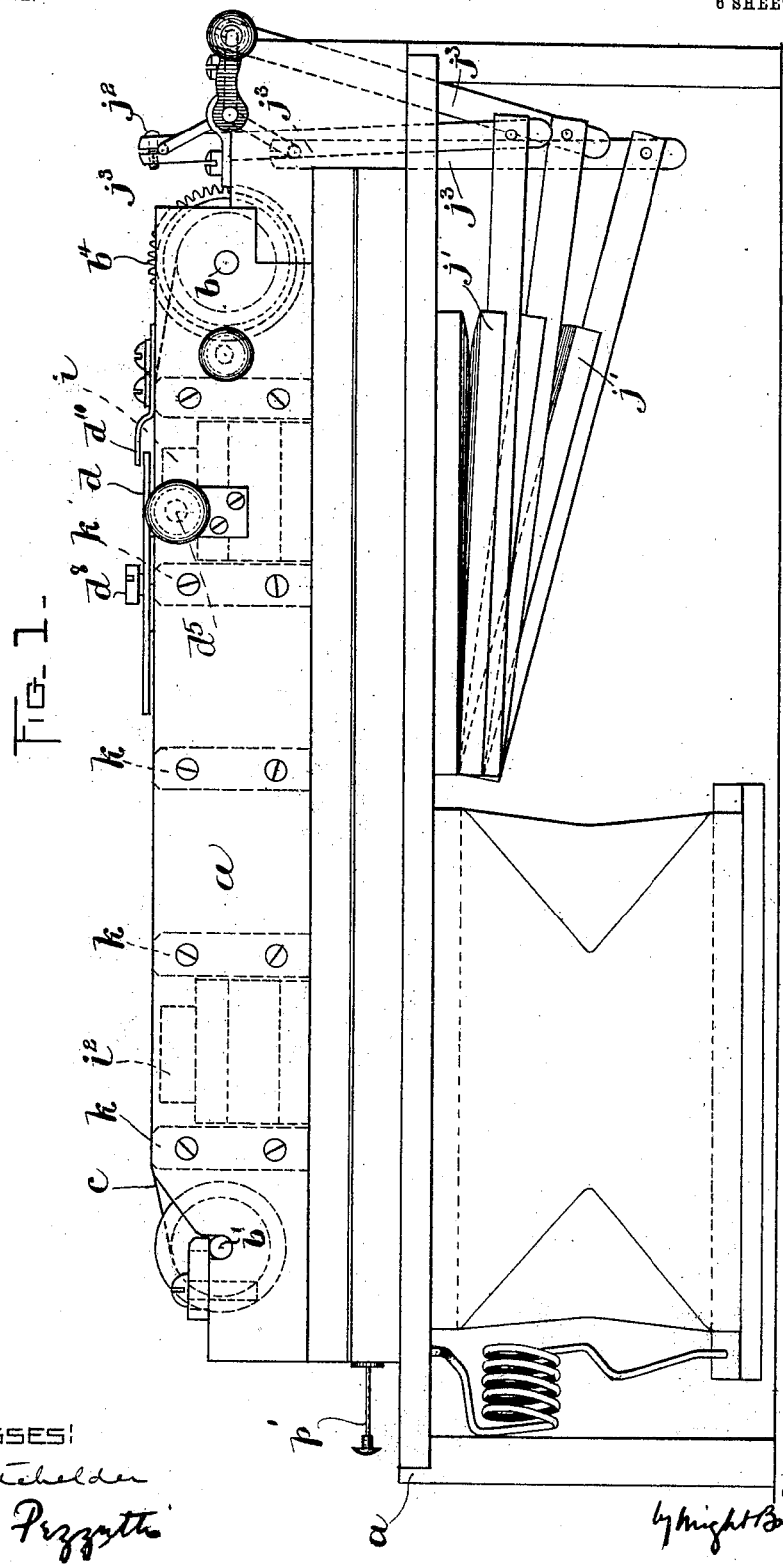
Figure 2:
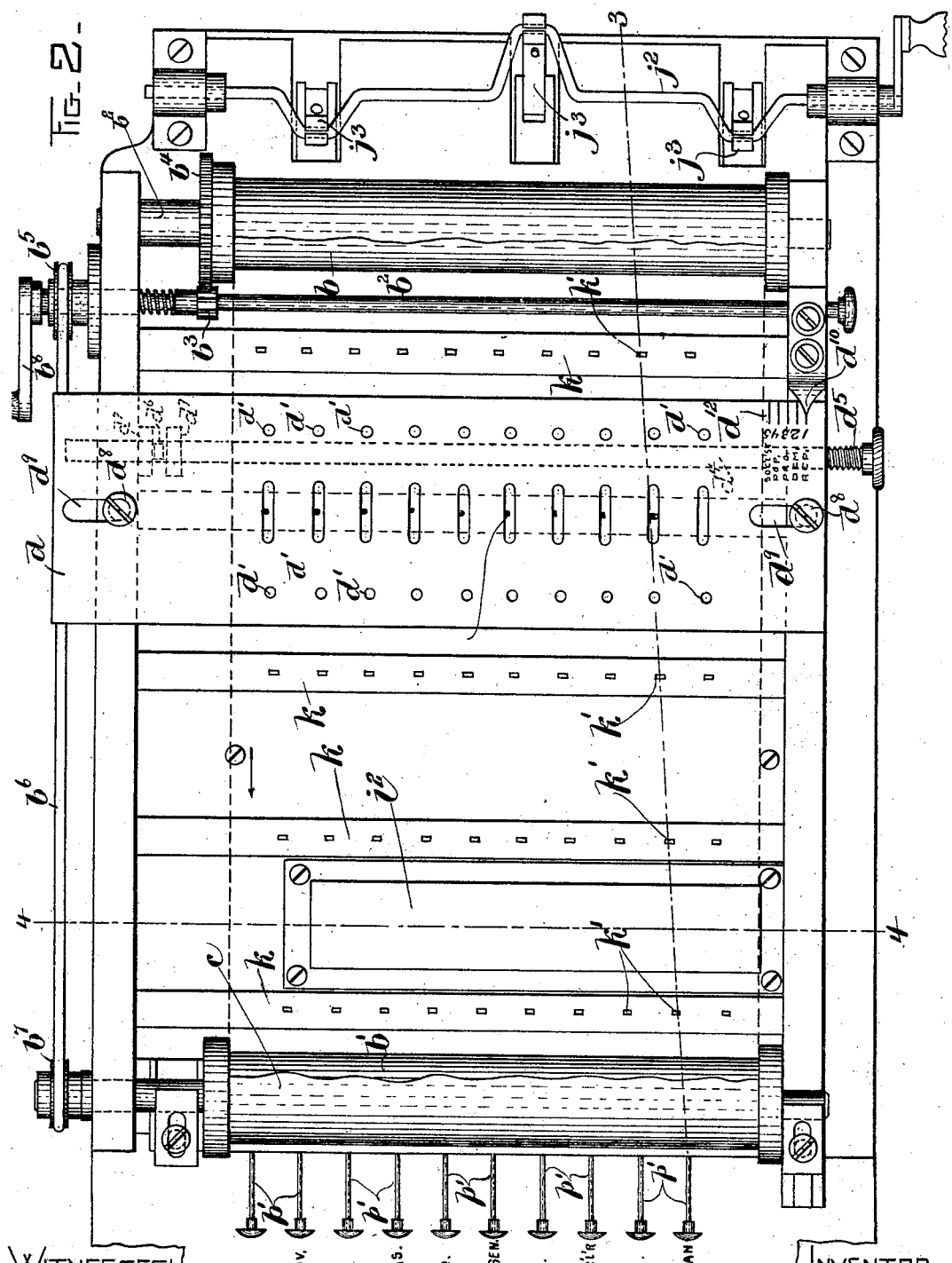
Figure 3:
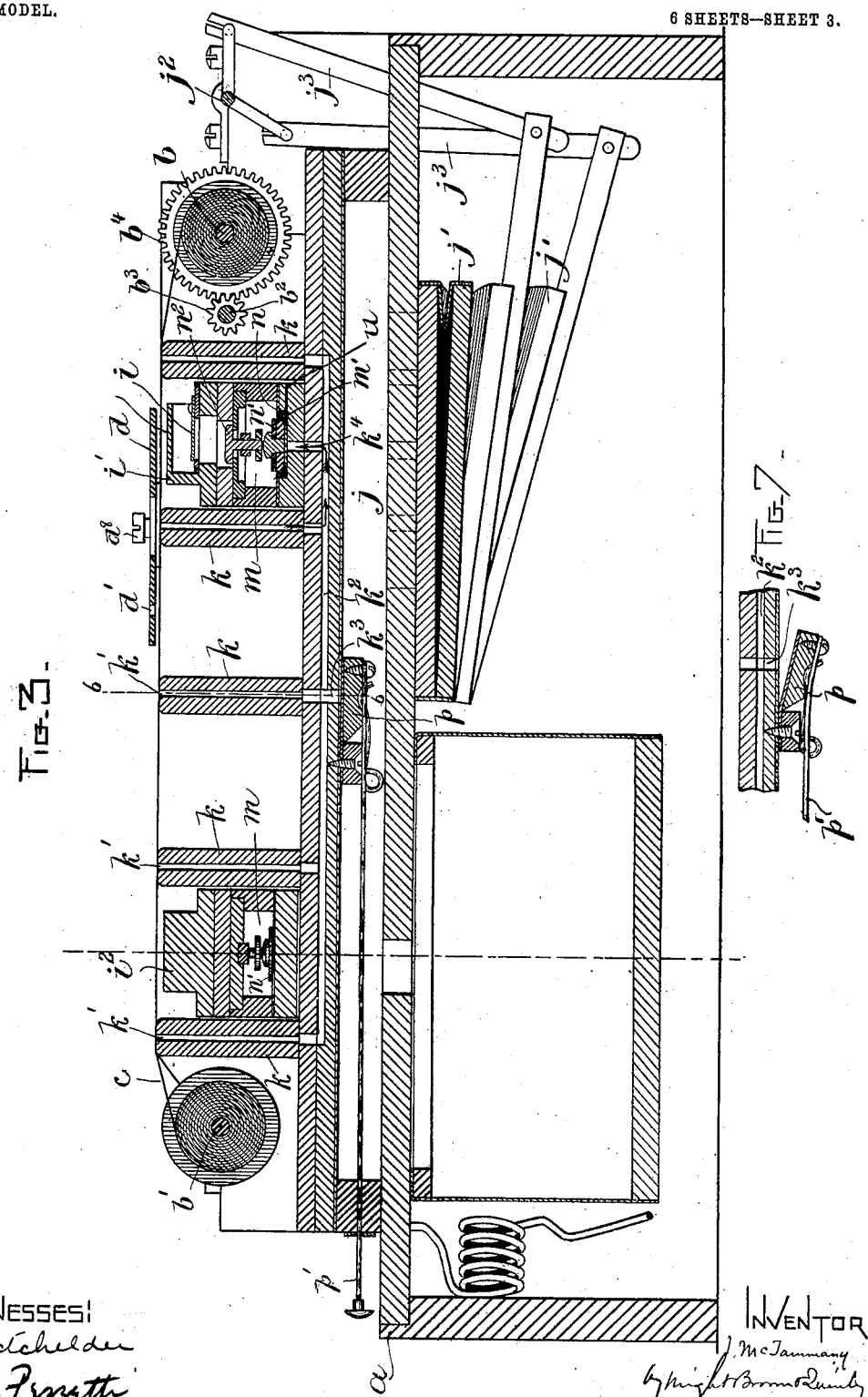
Figure 4:
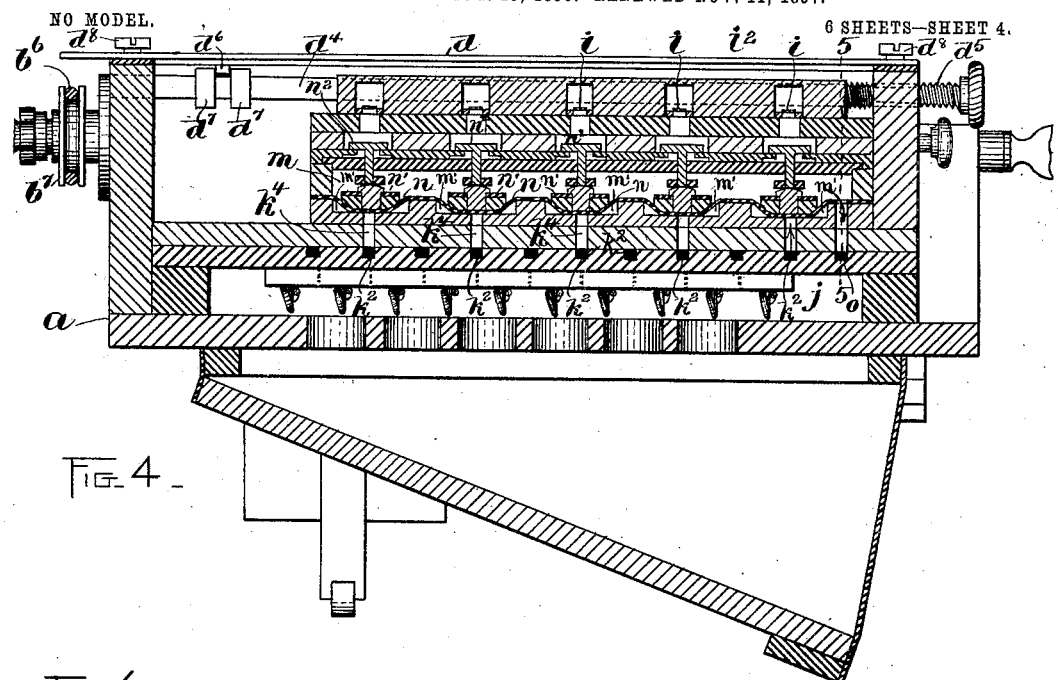
Figure 6:
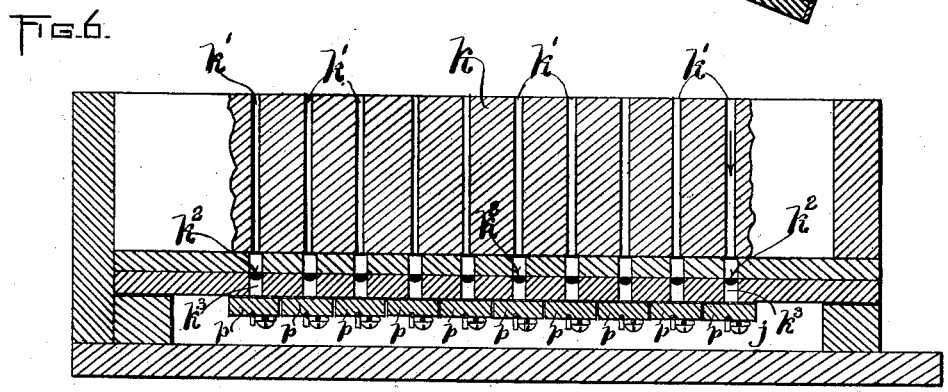
Figure 5:
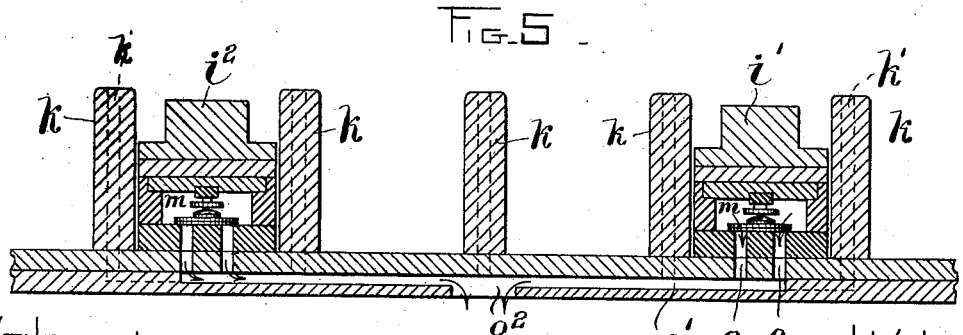

Of the accompanying drawings, forming a part of this specification, Figure 1 represents a side elevation of a machine embodying my invention. Fig. 2 represents a top view of the same. Fig. 3 represents a section on line 3 3 of Fig. 2. Fig. 4 represents a section on line 4 4 of Fig. 2. Fig. 5 represents a section on line 5 5 of Fig. 4. Fig. 6 represents a section on line 6 6 of Fig. 3. Fig. 7 represents a view similar to a portion of Fig. 3, showing a valve represented in the last-named figure opened. Fig. 8 represents a view of a portion of the tally-sheet. Fig. 9 represents an enlarged view showing the visual detector in place on the tally-sheet, the ends being broken away. Figs. 10 to 14, inclusive, represent views of portions of the tally-sheet.

The same letters of reference indicate the same parts in all the figures.

In the drawings, $a$ represents a frame having bearings in which are journaled two rolls $b\ b'$, said rolls being parallel with each other and arranged so that a tally-sheet $c$ wound on one roll can be unwound therefrom and wound upon the other roll, a portion of the sheet being stretched between the two rolls for coöperation with the visual and audible indicating devices hereinafter described. Means are provided for simultaneously rotating the rolls $b\ b'$ to unwind the sheet from one and wind it on the other, the means here shown being a shaft $b^2$, journaled in the frame, a pinion $b^3$ on said shaft, a gear $b^4$ on the roll $b$, meshing with said pinion, a pulley $b^5$ on the shaft $b^2$, and a belt $b^6$, connecting the pulley $b^5$ with a pulley $b^7$ on the roll $b'$. A crank $b^8$, affixed to the shaft $b^2$, enables the latter to be rotated by hand; but said shaft may be rotated by power, if desired.

The tally-sheet $c$ contains a record of the votes of a number of voters, the said record being made by perforating the sheet when the latter is in a voting-machine having a series of parallel rows of punches arranged to be moved by the voter. Each row of punches is arranged to make a row of perforations across the tally-sheet and represents all the candidates of one political party. For example, the first row may represent the candidates of the Socialist party, the next the candidates of the Populist party, and so on, there being as many rows as there are tickets to be voted for, the number of tickets of parties being five in the present case. The machine is provided with sheet-feeding mechanism controlled by an official designated for that purpose, who moves the sheet lengthwise at right angles to the rows of punches after each voter has exercised his right, so that the perforations made by each voter are moved away from the punches before the next voter manipulates the punches. The punches in each row are arranged out of alinement with the punches of all the other rows, so that if all the punches of the machine were pushed in by a voter the result would be the arrangement of holes shown in Fig. 8, each vertical row representing all the candidates of one party, while the perforations at the upper ends of the rows form a row that extends obliquely of the sheet, as indicated by the line $x\ x$, Fig. 8, the next lower perforations forming an oblique line $y\ y$ parallel with the line $x\ x$, and so on across the sheet. All the perforations in each oblique line represent votes for the same office. For example, all the perforations on the oblique line $x\ x$ represent votes for the candidates of all the parties for governor, the perforations on the line $y\ y$ represent votes for the candidates of all the parties for lieutenant-governor, and so on, the arrangement being such that after the sheet has been moved endwise after a voter has finished his work the next voter, repeating the same operation, will make perforations along a line parallel with the lines $x\ x$, $y\ y$, but separated therefrom, so that all the perforations that can be made in the sheet are distinct from each other, it being impossible for two perforations to be run into each other at any part of the sheet.

A voting-machine adapted to be operated as above indicated is shown in my application for Letters Patent of the United States, filed July 11, 1896, Serial No. 598,863.

In case the voter votes properly—*i. e.*, for only one candidate for each office—his record will not be as indicated in Fig. 8—that is to say, at no part of his record will there be two perforations on an oblique line—the presence of two or more perforations on one oblique line indicating conclusively that a voter has voted for two candidates for the same office, so that his vote, so far as that office is concerned, is void. The record made on the tally-sheet by a voter properly exercising his right would therefore never be as shown in Fig. 8 and would not show two perforations on any one of the oblique lines there represented. My invention is intended to indicate quickly, either to the sense of sight or to the sense of hearing or to both senses, whenever a voter has voted for two or more candidates for the same office after the tally-sheet has been removed from the voting-machine and applied to the rolls $b\ b'$.

The visual detector is a plate $d$, which is mounted on the frame $a$ between the rolls $b\ b'$ in position to cover a part of the portion of the tally-sheet that is stretched between said rolls. The said plate is provided with a series of rows of sight-holes $d'\ d'$, which have the same oblique arrangement as the lines $x\ x$, $y\ y$, &c. Said sight-holes are arranged so that if two or more perforations have been made in the tally-sheet on one of said oblique lines they will be seen simultaneously through one of the rows of sight-holes, thus revealing at a glance the fact that a voter has voted for two or more candidates for the same office, whereas if the voter has punched the sheet properly not more than one perforation will be seen in any row of sight-holes in the plate $d$. There are as many rows of sight-holes in the plate $d$ as there are offices to be voted for, there being ten rows of sight-holes shown in the present case, corresponding to the ten offices on the ticket, as indicated in Fig. 9. The number of sight-holes in each oblique row is preferably the same as the number of tickets, as shown in Fig. 9, although the number may be less, two being shown in Fig. 2. The plate $d$ is adjustable on the frame $a$ crosswise of the tally-sheet, so that it may be held first with the sight-holes of the right-hand end of the plate in position to coincide with the perforations made by a voter voting the Socialist ticket. If the voter votes the "straight" ticket, his record will be a row of perforations extending across the sheet, as shown in Fig. 10. If now the same voter presses in the punch representing a vote for the Populist candidate for governor, he will have voted for two candidates for governor, and his record will show two perforations on an oblique line, as shown in Fig. 10. These two perforations will appear simultaneously through the first row of sight-holes in the plate $d$. By moving the entire sheet under the plate while it is in the described adjustment the fact that any voter of the Socialist ticket has voted for more than one candidate for the same office will be indicated. The plate may then be adjusted to bring the sight-holes at its right-hand end into position to coincide with the perforations made by a voter voting the Prohibition ticket and the sheet again moved under the plate, and so on, the plate being adjusted and the sheet moved as many times as there are tickets represented on the sheet. In Fig. 11 I show the position on the tally-sheet of a row of perforations made by a Populist voter, and in Figs. 12, 13, and 14 I show the records made, respectively, by a Prohibition, a Democrat, and a Republican voter. The reason for the adjustability of the plate $d$ lies in the fact that the perforations made by the Socialist voter form a row which differs in position with reference to the edges of the sheet from the row made by the Populist voter, whose row in turn differs in position from the row made by the Prohibitionist, and so on throughout the entire series of tickets, as shown by Figs. 10 to 14, inclusive. The plate $d$ may be adjusted by any suitable device, such as a rod $d^4$, having a screw-threaded portion $d^5$ engaged with a fixed nut on the frame, so that rotation of the rod will cause it to move endwise, and a stud $d^6$, affixed to the plate $d$ and engaged with collars $d^7\ d^7$ on the rod $d^4$, so that the plate moves with the rod. Screws $d^8\ d^8$, affixed to the frame and passing through slots $d^9\ d^9$ in the plate $d$, retain the latter upon the frame. A pointer $d^{10}$ on the frame coöperates with a scale $d^{12}$ on the plate $d$, in indicating the position of the plate for any ticket.

The audible detector indicates a series of reeds $b$, one for each office to be voted for, there being ten reeds in the present case, and means controlled by the perforations in the tally-sheet for admitting air to said reeds, the arrangement being such that when two or more perforations have been made by one voter in an oblique line a reed is operated and emits a sound, but remains silent otherwise. The reeds $i$ are preferably arranged in two series of five each, one being located in a holder $i'$ and the other in a holder $i^2$.

$j$ represents a suction box or chamber from which air is exhausted by a series of suction-bellows $j'$, which are operated by a crank-shaft $j^2$ and connecting-rods $j^3$. On the top of the suction-box $j$ are mounted a series of five channel-boards $k$, each containing a series of wind channels or ducts $k'$, which correspond in number and arrangement to the perforations in the tally-sheet represented in Fig. 8 and to the sight-holes $d'$ in the plate $d$. The upper edges of the channel-boards are arranged to support the portion of the tally-sheet between the rolls $b$ $b'$, as shown in Fig. 3, the sheet being guided so that if punched, as represented in Fig. 8, and drawn over the channel-boards all the perforations in the sheet would coincide simultaneously with the channels $k'$ and air would be drawn simultaneously through all the channels to the suction-box $j$ by the bellows $j'$, the connecting-channels $k'$ being in communication with horizontal channels $k^2$, formed in the top of the suction-box $j$, while the channels $k^2$ are in turn connected with the suction-box by short channels or ducts $k^3$. The horizontal connecting-channels $k^2$ are connected by short vertical channels $k^4$ with recesses or cavities $m'$ in the bottoms of secondary suction-boxes $m$ $m$, located under the reed-holders $i'$ $i'$. Flexible diaphragms $n$ extend across said cavities and separate them from the secondary suction-boxes. On the diaphragms rest disks $n'$, bearing against the depending stems of valves $n^2$, which normally close openings connecting the secondary suction-boxes $m$ with the reeds $i$. The secondary suction-boxes are connected by channels $o$ $o'$ $o^2$, Fig. 5, with the suction-box $j$. Each horizontal connecting-channel $k^2$ communicates with an oblique row of channels $k'$ in the channel-boards, there being a connecting-channel $k^2$ for every oblique row of channels $k'$.

To enable each connecting-channel $k^2$ and the accompanying row of channels $k'$ to be shut off from the suction-box $j$, so that air will not be drawn through said channels when perforations in the tally-sheet coincide with the outer ends of the channels $k'$, I provide a series of valves $p$, which are adapted to close the ports $k^3$, connecting the connecting-channels $k^2$ with the suction-box $j$, there being one valve for each connecting-channel $k^2$ and port $k^3$. Each valve has an operating-rod $p'$ extending to the exterior of the frame, by which it may be opened and closed.

Operation: All but one of the valves $p$ are left open, so that air can be drawn to the suction-box through all but one of the horizontal channels $k^2$ and the oblique row of channels $k'$, connected therewith. The tally-sheet is then set in motion over the channel-boards. The oblique line of channels in communication with the suction-box (which I will term the "operative" channels, all the others being rendered inoperative by the valves $p$) are in position to coincide simultaneously with two or more perforations that may have been made in an oblique line by the voter whose record is made in that part of the sheet which passes over the operative channels. When two or more perforations coincide simultaneously with a corresponding number of operative channels, sufficient air is admitted to the channels $k^2$ and $k^4$ and to the diaphragm-cavity $m'$, connected with said channel $k^4$, to enable the constantly-maintained vacuum in the secondary suction-box $m$ to raise the diaphragm $n$ and cause its disk $n'$ to open the valve $n^2$, and thus allow air to be drawn downwardly through the accompanying reed $i$ into chamber $m$, thereby sounding the reed, the exhaustion of chamber $m$ almost immediately returning the valve $n^2$ to its normal position. The machine thus audibly detects an illegal vote for the office represented by the operative channels. When, however, the voter has voted properly and has not made two or more perforations in the part of the tally-sheet referred to, only one perforation and operative channel will coincide at a time. A small air leak or vent is provided in each diaphragm-chamber $m'$ or in the air-passage communicating therewith, said leak or vent being, for example, a pin-hole or crevice $u$, Fig. 3, formed at any suitable point and adapted to release the air admitted through one of the channels $k'$. It will be seen, therefore, that the quantity of air admitted to the diaphragm-cavity $m'$ through one channel only escapes through said leak or vent, and therefore does not permit the above-described raising of the diaphragm, this operation requiring a volume of air such as would be admitted through not less than two perforations and channels and would create a diaphragm-raising pressure in the cavity $m'$ notwithstanding said leak. Hence the reed will not be sounded unless a voter has perforated the sheet improperly. The ports $k^3$ of the remaining series of ducts $k'$ being open to the suction-box $j$, any air entering these latter ducts $k'$ will pass at once into the suction-box, and any air that might enter chamber $m'$ through the opening $u$ by reason of differences in pressure between chambers $m$ and $m'$ will also be exhausted through said port $k^3$. By this arrangement the reeds other than those belonging to the series of the candidates under test or examination cannot be sounded, and thereby interfere with the accuracy of said test or examination. After one section of the sheet has been thus tested, another valve $p$ is closed, the first valve being opened, and the sheet is again run through the machine, and so on until all parts of the sheet have been tested.

I intend the term "detector" as used in the first of the following claims to include either the audible or the visual type above described, the apertures referred to in said claim being either the channels $k'$ in the channel-boards $k$ or the sight-holes $d'$ in the plate $d$.

I claim—

1. In a machine of the character specified, the combination of a frame or support, rolls journaled in bearings on said frame and arranged to move a flexible sheet endwise, and a detector having a series of apertures arranged in straight parallel lines obliquely arranged relatively to the direction of movement of the sheet and located between the rolls in position to coöperate with the portion of the sheet that extends from one roll to the other.

2. In a machine of the character specified, the combination of a frame or support, rolls journaled in bearings on said frame and arranged to move a flexible sheet endwise, and a plate supported by the frame in position to extend across the sheet between said rolls and provided with a series of rows of sight-holes, each row being arranged obliquely to the direction of movement of the sheet, whereby the plate is enabled to indicate visually the presence of correspondingly-arranged perforations in the sheet, substantially as and for the purpose specified.

3. In a machine of the character specified, the combination of a frame or support, rolls journaled in bearings on said frame and arranged to move a flexible sheet endwise, a plate supported by the frame in position to extend across the sheet between said rolls and provided with a series of obliquely-arranged rows of sight-holes, and means for adjusting the plate in a direction at right angles with the direction of movement of the sheet, whereby the plate is enabled to coöperate with different parts or sections of the sheet in indicating visually the presence of perforations in the sheet arranged to coöperate with the sight-holes in the plate.

4. In a machine of the character specified, the combination of a plurality of channel-boards each having a longitudinal series of channels, means for moving a perforated sheet across said channel-boards, a series of connecting-channels extending crosswise of the channel-boards, and each communicating with one channel in each channel-board, and a series of pneumatically-actuated instrumentalities communicating with said connecting-channels.

5. In a machine of the character specified, the combination of rolls journaled in bearings and arranged to move a flexible sheet endwise, a plurality of channel-boards between said rolls, each having a longitudinal series of channels, a series of connecting-channels extending crosswise of the channel-boards, and a series of pneumatically-actuated signaling devices communicating with said connecting-channels.

6. In a machine of the character specified, the combination of a frame or support, rolls journaled in bearings on said frame and arranged to move a flexible sheet endwise, a plurality of wind ducts or channels $k'$ arranged in oblique rows in supports or bearings against which the sheet bears, an air-actuating apparatus communicating with said ducts, a series of audible-signaling devices, such as reeds, corresponding in number with the oblique rows of channels, said signaling devices being connected by wind-passages with the air-exhausting device, valves which normally close said wind-passages, and pneumatically-controlled valve-operating means whereby a valve may be opened when two or more perforations in the tally-sheet coincide simultaneously with two or more channels in the operative oblique row.

7. In a machine of the character specified, the combination of a frame or support, rolls journaled in bearings on said frame and arranged to move a flexible sheet endwise, a plurality of wind ducts or channels $k'$ arranged in oblique rows in supports or bearings against which the sheet bears, an air-exhausting apparatus communicating with said ducts, a series of audible-signaling devices, such as reeds, corresponding in number with the oblique rows of channels, said signaling devices being connected by wind-passages with the air-exhausting device, valves which normally close said wind-passages, a series of valves independently operated, whereby all but one of the rows of channels may be disconnected from the air-exhausting apparatus to make only one row operative at a time, and pneumatically-controlled valve-operating means whereby a valve may be opened when two or more perforations in the tally-sheet coincide simultaneously with two or more channels in the operative oblique row.

In testimony whereof I have signed my name to this specification, in the presence of two subscribing witnesses, this 28th day of July, A. D. 1896.

JOHN McTAMMANY.

Witnesses:
C. F. BROWN,
E. BATCHELDER.